United States Patent [19]

Kunz et al.

[11] Patent Number: 5,271,162

[45] Date of Patent: Dec. 21, 1993

[54] PROCESS FOR THE EMISSION-FREE DRYING OF A SUBSTANCE IN A DRYING DRUM

[75] Inventors: Werner Kunz, Lenzburg; Armin Vonplon, Oberlunkhofen, both of Switzerland

[73] Assignee: SC Technology AG, Villmergen, Switzerland

[21] Appl. No.: 697,328

[22] Filed: May 8, 1991

[30] Foreign Application Priority Data

May 18, 1990 [CH] Switzerland ............ 1707/90-0

[51] Int. Cl.⁵ .................................. F26B 21/06
[52] U.S. Cl. ................................. 34/27; 34/35; 34/86; 34/77; 34/78; 34/79
[58] Field of Search ............ 34/79, 76, 77, 78, 72-74, 34/15, 22, 27, 35, 92, 86, 131, 132

[56] References Cited

U.S. PATENT DOCUMENTS

| | | | |
|---|---|---|---|
| 3,437,321 | 4/1969 | Wilkinson | 34/79 |
| 4,218,832 | 8/1980 | Daniels | 34/79 |
| 4,628,619 | 12/1986 | Janusch et al. | 34/79 |
| 4,715,965 | 12/1987 | Sigerson et al. | 34/79 |
| 4,759,777 | 7/1988 | Balakrishnan et al. | 34/79 |
| 4,780,965 | 11/1988 | Grafen et al. | 34/79 |
| 4,888,884 | 12/1989 | Bartling et al. | 34/79 |
| 4,926,567 | 5/1990 | Ogawa | 34/79 |
| 4,974,335 | 12/1990 | Bege et al. | 34/79 |

Primary Examiner—Henry A. Bennet
Assistant Examiner—Denise Gromada
Attorney, Agent, or Firm—EGLI International

[57] ABSTRACT

The process for low-emission drying of a substance in a drum-type drying installation is suitable in particular for sewage sludge, fish meal and sludges from starch factories, soap factories and paper mills, which substances are preferably to be converted into granules. The process is likewise very suitable for drying biomass products such as wood chips, grass, sugar beet chips and the like, since the emissions are very greatly reduced by means of this process. The drying process is carried out in such a way that no unpleasant odors and dusts are emitted to the outside, because the actual drying circulation is closed. Fossil fuels are used as the heat source for the burner for heating this air stream.

8 Claims, 2 Drawing Sheets

PROCESS FOR THE EMISSION-FREE DRYING OF A SUBSTANCE IN A DRYING DRUM

BACKGROUND OF THE INVENTION

1. Field of the Invention

The invention relates to a process for the emission-free drying of a substance in a drying drum.

2. Discussion of the Prior Art

Such substances include, for example, sewage sludge, fish meal, sludges from starch factories, soap factories and paper mills, and also biomass such as wood chips, grass and sugar beet chips.

Such substances can cause considerable pollution of the environment by odors and dust, and this is particularly unpleasant where the plant, for example a sewage sludge plant, is operated in the close proximity of residential dwellings. The odour pollution occurs in particular when evil-smelling substances are dried.

SUMMARY OF THE INVENTION

It is thus the object of the invention to provide a process of the type described at the outset, in which no odour or dust nuisance is caused in the environment.

According to the invention, this object is achieved in such a way that a closed vapour/air circulation is used, in which the pressure in the region of the product charge and of the seals at rotating parts is below the pressure of the surrounding air, so that no emission of odour or dust can be discharged to the surroundings during the drying process, and the water evaporated during drying, filter-flushing air and leakage air are continuously purged from the closed drying circulation, that the water vapour content is condensed out as far as possible in a downstream condenser and the uncondensable gases are fed as combustion air to the combustion chamber for generating the heat for the drying cycle, and that the temperature in the combustion chamber is above 750° C. in order to ensure complete combustion of all odorous substances.

In one embodiment, the flue gases pass through the combustion chamber and then through a gas/gas heat exchanger in which they release the major part of their heat content to the vapour/air mixture of the drying circulation.

It is also possible continuously to purge a part stream of the vapour/air mixture and to feed it to a condenser, the resulting condensate being passed to further heat utilisation.

As a result of a combination of filtration device, condenser and post-combustion in the combustion chamber, the purged air and flue gases from the combustion chamber can be discharged to the atmosphere virtually free of odour and dust ($<2$ mg/m$^3$(S.T.P.)) and without a visible vapour plume.

Preferably, a substantial part of the heat expended for drying is, owing to the dew point (80°–90° C.) which is unusually high for a drum drier due to the closed drying air circulation, used for the heating of buildings, for product preheating or for other heat carriers, and multistage heat utilisation is thus accomplished.

Alternatively, the product vapour can also be fed to a heat consumer for the preconcentration of products or for air-heating in a gas heat exchanger.

Expediently, the air from all conveying equipment and silos is extracted to keep the plant free of odours and dust, and fed to the combustion chamber.

The drying energy used is preferably fossil energy.

BRIEF DESCRIPTION OF THE DRAWING

An illustrative example of the subject of the invention is explained below in more detail with reference to the drawings.

DESCRIPTION OF THE PREFERRED EMBODIMENTS

Figure 1:
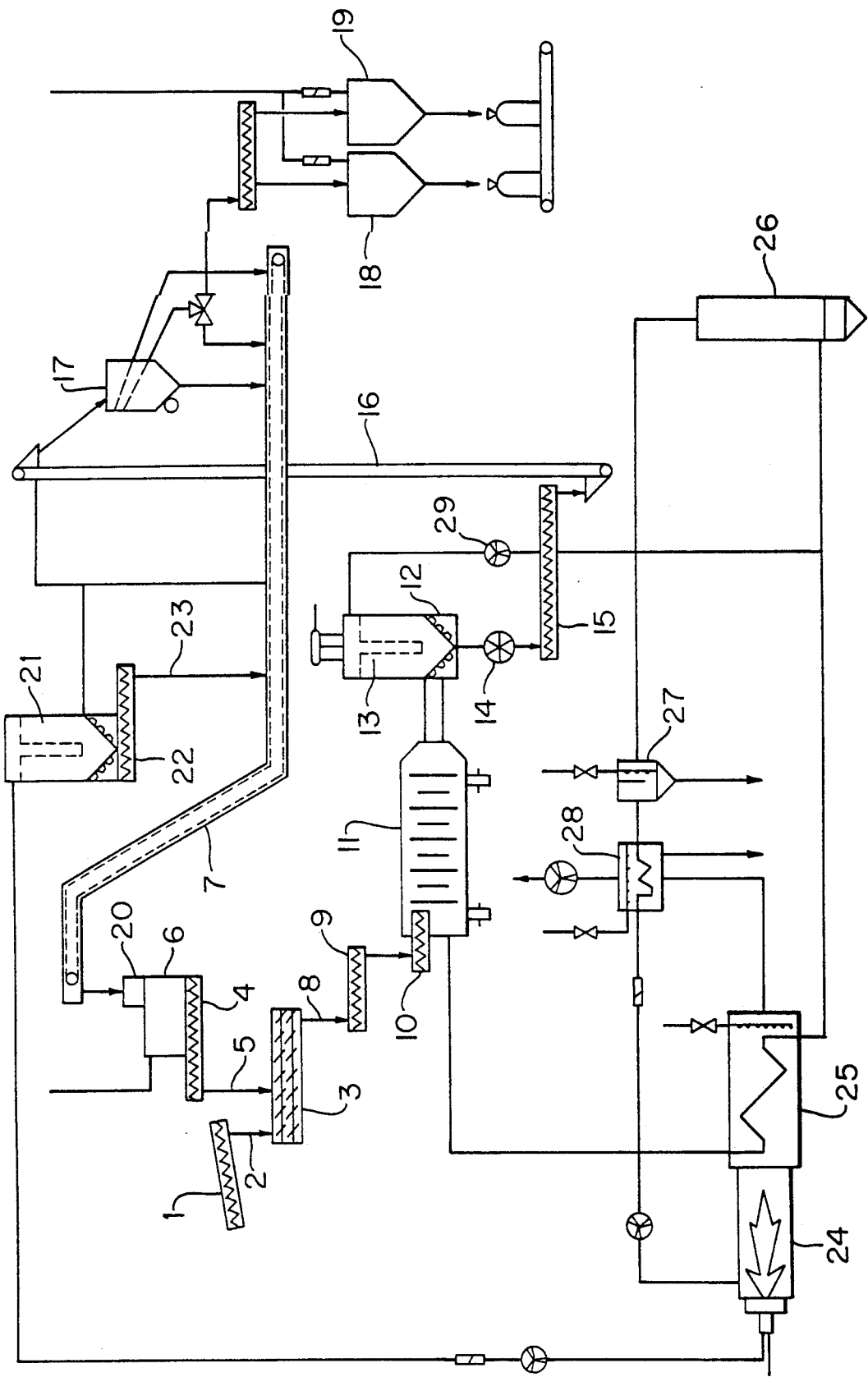
FIG. 1 shows a flow diagram of a plant for processing sewage sludge into granules, pursuant to the present invention.
Figure 2:
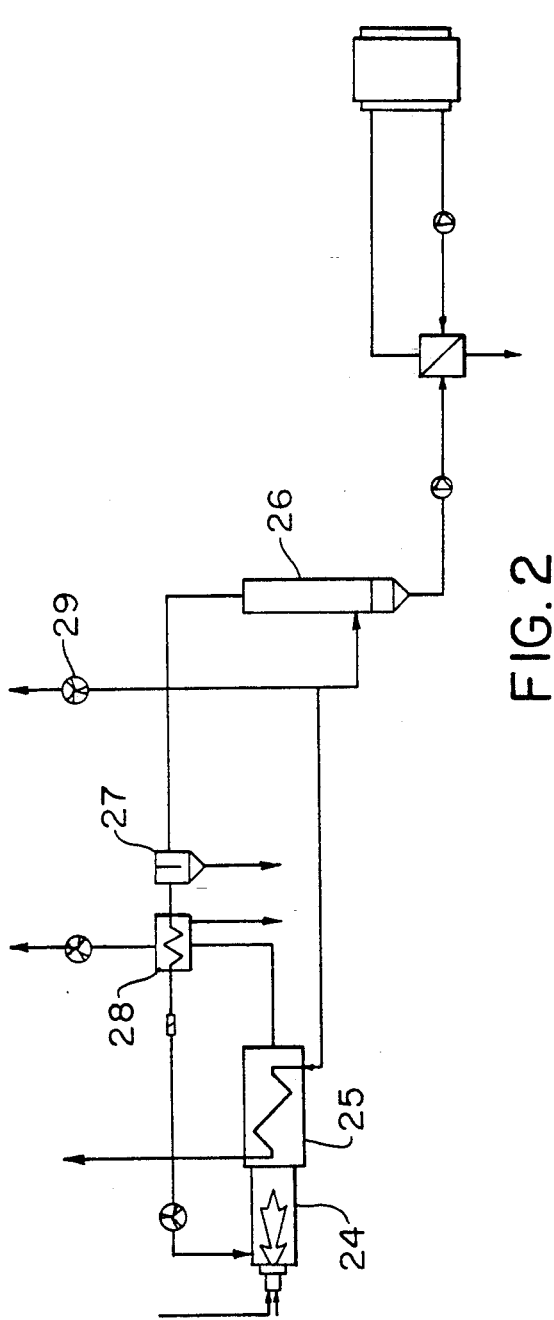
FIG. 2 shows a portion of the flow diagram of FIG. 1, with the addition of illustrating use of heat extracted by the condenser.
Figure 3:
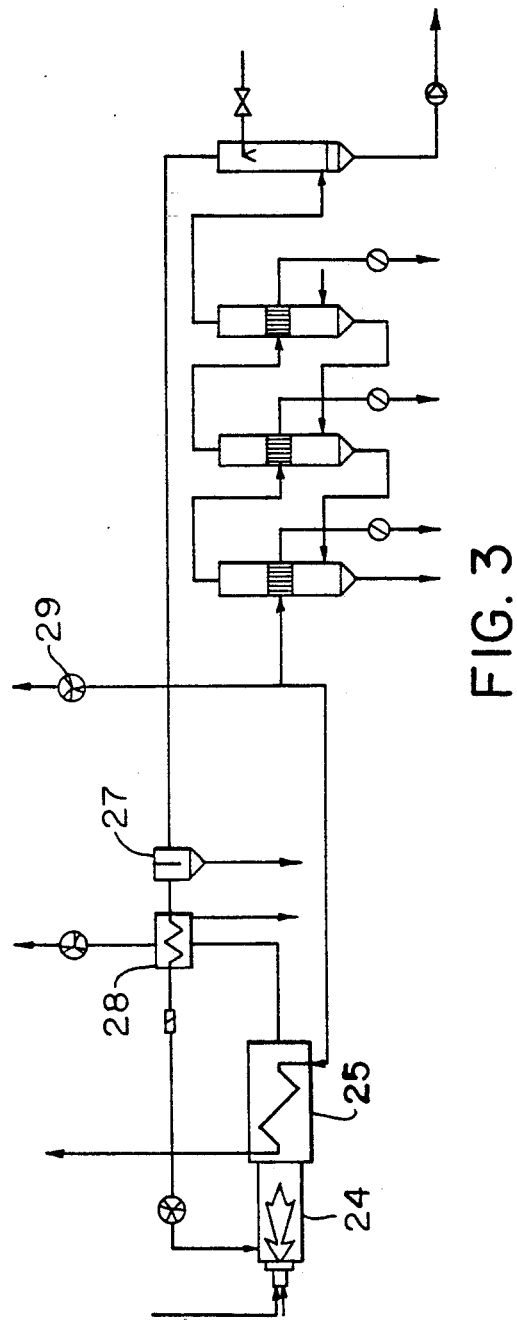
FIG. 3 shows a further embodiment in which the vapor/air mixture is used for reheating and preheating.

By means of a conveyor screw 1, dehydrated sludge 2 is fed to a twin-shaft mixer 3, which is also supplied by a second conveyor screw 7 with dried material 5 from a silo 6 supplied via a drag-chain conveyor 7. The dried material 4 consists preferably of a dried end product of the same sludge type as the product which is to be processed. The granules are here classified on a vibratory screen 17 into three fractions, the smallest and the largest granule sizes being admixed to the sludge. The middle fraction, on the other hand, is packaged in bags and can be used as a fertiliser. The quantity which cannot be sold as fertiliser can also be incinerated and has a calorific value which approximately corresponds to that of lignite.

From the twin-shaft mixer 3, the free-flowing mixture 8 is passed by conveyor screws 9 and 10 to a drying drum 11, to which the dry granules are fed at the outlet by fluidisation, whereas the wet particles advance more slowly and repeatedly drop to the bottom, until they are sufficiently dry and flow to the outlet.

The dried sewage sludge arising as granules is separated downstream of the drum 11 from the air/vapour mixture by means of a cyclone separator 12 with an integrated hose filter 13 and the granules pass via a discharge lock 14, an inclined screw 15 and elevator 16 to the vibratory screen 17, which effects the sorting into the three granule sizes. Cooling of the end product is carried out in counter-current with ambient air and prevents the formation of condensate in the storage silos or after packing.

The granules have a grain size of about 2 to 4 mm, are dust-free and hygienically acceptable and, after cooling silos 18 and 19, can be passed selectively to various storage, loading or bagging installations.

The conveying of the granule recycle comprises the drag-chain conveyor 7, a crusher mill 20, the dried material recycle silo 6 and the metering screw 4.

In the combustion chamber 24, the gases from the processing and conveying means and the granule cooler are heated to more than 750° C. by means of fossil fuels. The heat content of these gases is released in a heat exchanger 25 to the vapour/air mixture of the closed drier circulation. The vapour/air mixture is heated in the heat exchanger to about 500° C., dries the product in the drum drier, is thus cooled and takes up the evaporated water.

Downstream of the drum drier, the product is separated from the vapour/air mixture in a cyclone 11 with an integrated dust filter 13. By means of a fan 29, the vapour/air mixture is returned to the heat exchanger 25 for heating, a part of the vapour/air mixture being continuously extracted and fed to the condenser 26, or as combustion air to the combustion chamber 24.

After the condensation, the air fraction from the drying circulation can also be fed via a demister 27 and an exit air heat exchanger 28 as combustion air to the combustion chamber 24.

The heat extracted by means of the condensation creates, owing to the high temperature level of 85° to 90° C., ideal conditions for heat utilisation, such as the digestion tower treatment, sludge preheating and the like.

The air drawn in by the conveyor devices and the cooling air from the dried material silos are purified in the hose filter 21 and, together with the air purged from the drying circulation, fed as combustion air to the combustion chamber 24. The fine particles 23 present in the hose filter 21 are likewise fed via a discharge screw 22 to the drag-chain conveyor 7 for recycle to the silo 6.

To keep it free of odour and dust, the plant is provided with extraction means, and plant sections as well as conveying elements are operated under reduced pressure, so that an escape of odour-laden air and vapour condensation in the conveying elements are prevented.

The air extracted from the transport devices and the cooling air from the dried material silos are purified in a hose filter and, together with the air purged from the drying circulation, fed as combustion air to the combustion chamber 24.

The performance data and operating data of the plant described in the example and further arrangement data are as follows:

As variant 1, the actual consumption and operating data in a plant which is operated without sludge preheating or further waste heat utilisation are listed.

In variant 2, the data of a version of the same design are shown for operation with sludge preheating and a dry solids content which is thus 2% higher.

In variant 3, the operating data for operation with sludge preheating and waste heat utilisation for digestion tower heating of 420 kW are listed.

| 1. Throughput performance and water evaporation | | | | |
|---|---|---|---|---|
| Variant | 1 | 2 | 3 | |
| Dry solids | 473.6 | 523.0 | 523.0 | kg dry solids/h |
| Dry solids before drier | 28 | 30 | 30 | % dry solids |
| Dry solids after drier | 95 | 95 | 95 | % dry solids |
| Quantity of sewage sludge before drier | 1691.4 | 1743.5 | 1743.5 | kg/h |
| Quantity of sewage sludge after drier | 498.5 | 550.6 | 550.6 | kg/h |
| Water evaporated per line | 1192.9 | 1192.9 | 1192.9 | kg evaporated water/h |

| 2. Heat requirement | | | | |
|---|---|---|---|---|
| Variant | 1 | 2 | 3 | |
| Temperature curve. | | | | |
| Temperature in | 450 | 450 | 450° C. | |
| Temperature out | 125 | 126 | 126° C. | |
| Heat generator rating | 1.171 | 1.108 | 1.108 MW | |
| Fuel | Biogas | Biogas | Biogas | |
| Calorific value | 5400 | 5400 | 5400 | kcal/m³ (S.T.P.) |

| -continued | | | |
|---|---|---|---|
| 2. Heat requirement | | | |
| Variant | 1 | 2 | 3 |
| Fuel consumption | 186 | 176 | 176 m³ (S.T.P.)/h |

The power consumption for drives in this plant (excluding dehydration) is about 60 kW.

| Specific heat requirement | | | | |
|---|---|---|---|---|
| Variant | 1 | 2 | 3 | |
| per kg of water evaporated | 0.981 | 0.929 | 0.577 | kWh/kg |
| per kg of sludge with 28(30)% dry solids | 0.692 | 0.636 | 0.395 | kWh/kg |
| per kg of sludge with 95% dry solids | 2.348 | 2.013 | 1.250 | kW/kg |
| per kg of dry solids | 2.472 | 2.119 | 2.119 | kW/kg |

All plant parts with the exception of the dry granule silos are made of stainless steel.

The thermal data are listed in the above table.

The plant can be monitored froma central control room. Apart from periodic lubrication work, no special maintenance work is necessary.

TABLE 1

Emissions in the effluent from the plant described in the example.

| | | | | |
|---|---|---|---|---|
| pH | 8.9 | 8.9 | 8.9 | 8.9 |
| dry solids % | 0.04 | 0.04 | 0.04 | 0.04 |
| COD mg/l | 34.4 | 51.5 | 33.0 | 43.2 |
| DOC mgC/l | 3.4 | 3.0 | 2.9 | 2.9 |
| $NH_4$ mgN/l | 27.9 | 27.8 | 27.8 | 28.1 |
| Kjeld. N mgN/l | 27.9 | 27.3 | 27.8 | 28.1 |
| Total P mgP/l | 7.6 | 6.7 | 7.2 | 6.9 |
| $BOD_5$ mg/l | 6 | 6 | 5 | 5 |

Table 2

Emission/exit gas values of the flue gases from the plant described in the example.

Fuel: Biogas

In the table which follows, the averages of the parameters measured during a measuring day are compiled.

All the values refer to an $O_2$ value of 3% and are given for dry gas in the standard state (273° K, 1013 mbar).

| Substance | Concentration | LRV/KJGA limit |
|---|---|---|
| Oxygen $O_2$ % | 13.9 +/− 0.5 | — |
| Carbon dioxide $CO_2$ % | 5.3 +/− 0.5 | — |
| Solids mg/m³ (S.T.P.) | 0.8 +/− 0.5 | 50 |
| Heavy metals (dust-free and passing the filter | | |
| lead Pb mg/m³ (S.T.P.) | 0.13 +/− 0.05 | 5 |
| zinc Zn mg/m³ (S.T.P.) | <0.05 | — |
| cadmium Cd mg/m³ (S.T.P.) | 0.004 +/− 0.002 | 0.2 |
| Mercury Hg mg/m³ (S.T.P.) | <0.004 | 0.2 |
| Hydrogen chloride HCl mg/m³ (S.T.P.) | 17 +/− 2 | 30 |
| Hydrogen fluoride HF mg/m³ (S.T.P.) | <0.4 | 5 |
| Sulphur dioxide $SO_2$ mg/m³ (S.T.P.) | 39 +/− 4 | 500 |
| Total carbon as C mg/m³ (S.T.P.) | 39 +/− 4 | 50 |

As compared with existing designs, the drum drier plant described has, inter alia, the following advantages:

very low emission level, and in particular also no odour emission and no vapour plume. All the limits are met, and in most cases the values are considerably lower (see also measured values according to Table 2), high availability due to the proven drum drier concept, dust-free, homogeneous and bacteriologically acceptable granules as the end product which can be stored without problems, adaptability of the plant without problems to varying sludge qualities and moisture contents (Table 1), high heat recovery potential from the condensate, scope for utilising biogas, and undemanding with respect to operation and maintenance.

The properties of a rotary drum drier plant with closed loop drying process are:

100% recirculation air rate with purging of leakage air and evaporated water, inclusion of an air/air heat exchanger, inclusion of a combined cyclone/hose filter separator in the drying circulation, leakage air and odour-laden air drawn in by the conveyor elements are used as combustion air for hot-gas generation, and all moving seals and all openings are under a negative pressure.

While the invention has been particularly shown and described with respect to the preferred embodiments thereof, it should be understood by those skilled in the art that the foregoing and other changes in form and details may be made therein without departing from the spirit and scope of the invention which should be limited only by the scope of the appended claims.

We claim:

1. A process for the low emission drying of a substance in a closed loop drum dryer installation, said process comprising the steps of:
   (a) maintaining the pressure of an air and vapor mixture within the closed loop drum dryer installation below external atmospheric pressure such that no emission of gaseous odor and dust can escape from the installation to the external atmosphere during the drying process;
   (b) continuously purging water evaporated during drying, filter flushing air, and leakage air from the closed loop drum drying installation;
   (c) condensing water vapor contained within the air and vapor mixture in a downstream condenser and then feeding the uncondensable gases to a combustion chamber for generating heat energy for use during the drying cycle;
   (d) maintaining a temperature in the combustion chamber to ensure complete combustion of all odorous substances; and
   (e) discharging purged air and flue gases from the combustion chamber essentially free from odor and dust, and without a visible vapor plume.

2. The process for the low emission drying of a substance according to claim 1, wherein the temperature within the combustion chamber is maintained about or above 750 degrees centigrade.

3. The process for the low emission drying of a substance according to claim 2, wherein the flue gases from the combustion chamber are directed through a tube shell type heat exchanger in which the flue gases release a major portion of the heat energy contained therein to heat up the air and vapor mixture.

4. The process for the low emission drying of a substance according to claim 3, wherein the step of condensing water vapor comprises continuously purging a partial stream of the air and vapor mixture and directing it to the condenser wherein the resulting condensate is used for heat recovery and heating up the digestion of the sewage sludge and room heating.

5. The process for the low emission drying of a substance according to claim 4, wherein the air and vapor mixture is heated in a manner to achieve a high dew point of between 350 and 360 kelvin and the purged air and vapor mixture being used for product reheating and multi-stage heat utilization in preheating flash dryers.

6. The process for the low emission drying of a substance according to claim 5, wherein the purged air and vapor mixture is fed in a heat consumer for the preconcentration of products and for air-heating in a gas heat exchanger.

7. The process for the low emission drying of a substance according to claim 2, further comprising the step of extracting the air from all substance conveying equipment and silos and feeding it to said combustion chamber.

8. The process for the low emission drying of a substance according to claim 2, wherein the oxygen content within said closed loop drum dryer installation is maintained at less than 7 volume percent, thereby minimizing explosion and fire potential when drying peat, brown coal, wood chips and sewage sludge.

* * * * *